US008360117B2

(12) United States Patent
Hajiaghajani

(10) Patent No.: US 8,360,117 B2
(45) Date of Patent: Jan. 29, 2013

(54) SYSTEM AND METHOD FOR MONITORING A GROUND CONNECTION

(75) Inventor: Masoud Hajiaghajani, Houston, TX (US)

(73) Assignee: Texaco Inc., San Ramon, CA (US)

( * ) Notice: Subject to any disclaimer, the term of this patent is extended or adjusted under 35 U.S.C. 154(b) by 1379 days.

(21) Appl. No.: 11/710,514

(22) Filed: Feb. 26, 2007

(65) Prior Publication Data

US 2008/0202624 A1 Aug. 28, 2008

(51) Int. Cl.
*H02H 3/04* (2006.01)
*B65B 3/04* (2006.01)

(52) U.S. Cl. .............. 141/94; 141/1; 361/215; 361/217; 340/649

(58) Field of Classification Search .................... 141/94, 141/1; 361/212, 216–217; 340/649, 652
See application file for complete search history.

(56) References Cited

U.S. PATENT DOCUMENTS

| | | | | | |
|---|---|---|---|---|---|
| 2,767,659 | A * | 10/1956 | Greenblatt | ...................... | 141/98 |
| 5,105,325 | A * | 4/1992 | Lawrence | ........................ | 361/42 |
| 5,159,523 | A * | 10/1992 | Claassen et al. | .............. | 361/215 |
| 6,834,688 | B2 * | 12/2004 | Ono et al. | ........................ | 141/94 |
| 7,013,930 | B2 * | 3/2006 | Mann | .............................. | 141/94 |
| 7,068,488 | B1 * | 6/2006 | Van Leuven | .................. | 361/220 |
| 7,191,808 | B2 * | 3/2007 | Mathison | ........................ | 141/94 |
| 7,246,640 | B2 * | 7/2007 | Yang | ............................... | 141/94 |
| 7,408,758 | B2 * | 8/2008 | Myers et al. | .................. | 361/215 |

* cited by examiner

*Primary Examiner* — Gregory Huson
*Assistant Examiner* — Nicolas A Arnett
(74) *Attorney, Agent, or Firm* — Merchant & Gould

(57) ABSTRACT

Exemplary systems and methods are directed to monitoring a ground connection at a fueling facility. The system being configured to perform the method that includes measuring a vehicle ground quality. The method also includes determining a dispenser ground quality, evaluating the vehicle ground quality based on the dispenser ground quality and a threshold value, and controlling the dispensing of fuel based on the evaluation.

14 Claims, 4 Drawing Sheets

SYSTEM AND METHOD FOR MONITORING A GROUND CONNECTION

BACKGROUND

1. Field

Systems and methods are disclosed for communicating ground sensor data.

2. Background Information

Hydrogen and fuel cell vehicles help our nation reduce its consumption of fossil fuels. In a fuel cell vehicle, hydrogen combines with oxygen to produce an electric current that powers an electric motor. A fuel cell vehicle has a smooth, quiet ride, which emits water vapor as a byproduct from the tailpipe.

Hydrogen is nontoxic, non-corrosive, and when used as a fuel is highly combustible. Today, fueling stations and vehicles have built-in safety systems. These systems can be different depending upon the type of fuel. With fuel, one safety consideration involves avoiding leaks, and avoiding the opportunity for fuel to ignite. Fuel cell cars and hydrogen fueling stations can be designed to prevent hydrogen from leaking by using redundant systems which can shut down automatically if an accident occurs.

Hydrogen fueling stations are like traditional gas stations in that many of the same safety precautions apply. An exemplary safety precaution includes grounding both the vehicle and the fuel dispenser to prevent static electricity. Factors that can affect the ground quality of a ground connection include environmental conditions, such as changes in temperature or humidity. Moreover, vehicle characteristics, such as tire wear, tire pressure or other diagnostic parameters may impact the vehicle ground quality.

SUMMARY

An exemplary method is disclosed for controlling the dispensing of fuel based on ground detection. The method includes measuring a vehicle ground quality. The method includes determining a dispenser ground quality, evaluating the vehicle ground quality based on the dispenser ground quality and a threshold value, and controlling the dispensing of fuel based on the evaluation.

In accordance with alternate embodiments, an exemplary system for controlling a dispensing of fuel includes a fuel dispenser having a sensor for determining a dispenser ground quality, and a vehicle processor that determines a vehicle ground quality. The system includes a controller that evaluates the vehicle ground quality based on the dispenser ground quality and a threshold value, and controls the dispensing of fuel based on the evaluation.

In other alternative embodiments, an apparatus that determines a ground quality of a vehicle to be fueled at a fueling facility includes means for storing a dispenser ground quality value, means for grounding the vehicle, and means for detecting a vehicle ground quality value. The apparatus includes means for generating a control signal based on a comparison of the facility ground quality value and the vehicle ground quality value and sending the control signal to the dispenser to control the dispensing of fuel.

DESCRIPTION OF THE DRAWINGS

Other advantages and features described herein will be more readily apparent to those skilled in the art when reading the following detailed description in connection with the accompanying drawings, wherein.

DETAILED DESCRIPTION

Figures 1A, 1B:
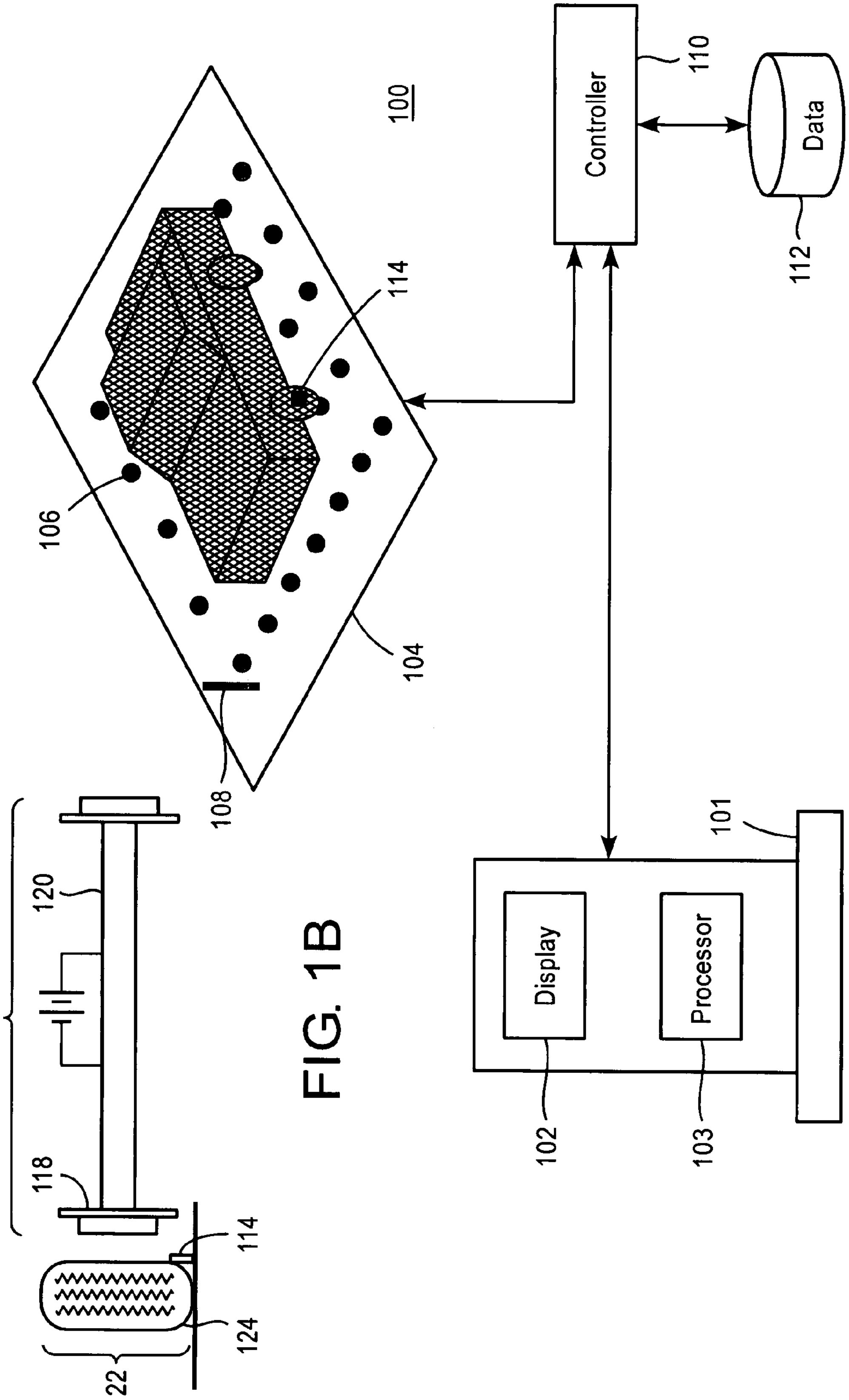
FIGS. 1*a* and 1*b* show an exemplary system for controlling the dispensing of fuel.

FIG. 1 shows an exemplary system for controlling a fuel dispensing process based on ground quality detection. The system 100 includes means, such as a fuel dispenser 101, for dispensing fuel to a vehicle.

The fuel dispenser 101 serves as an interface between a fuel source and a vehicle to be fueled. The fuel dispenser 101 includes those components and circuitry that are found in fuel dispensing devices. For example, the fuel dispenser 101 can include a user interface such as a display 102 (e.g., a backlit digital or analog display), a keypad, and/or status lights. The dispenser 101 can include a data and grounding cable, a fueling hose, a fueling nozzle, and a cabinet. In addition, the fuel dispenser 101 can have a data bus for transmitting data signals, a power bus for transmitting power signals, a fuel supply line, and an air, $N_2$ or $H_2$ line to control valves. In exemplary embodiments, the fuel dispenser 101 can include a processor 103 that monitors a status of the fuel dispenser 101 and conducts data communication with other devices. The processor 103 can be configured to communicate with peripheral devices via, for example, the data bus, over a wireless communication channel, or through any other communication medium as desired.

The system 100 includes means, such as a vehicle pad 104, for receiving a vehicle to be fueled and detecting a quality of a ground connection. The vehicle pad 104 can be implemented as a concrete slab or other rigid structure as desired, which is suitable for supporting a vehicle. The vehicle pad 104 can be located in proximity to the fuel dispenser 101 (i.e., any distance suitable for connecting the vehicle with the dispenser) to allow for fueling the vehicle. The vehicle pad 104 includes means, such as a sensor/electrode array 106, for detecting whether a vehicle is present on the vehicle pad 104 and for applying a voltage across selected points on the vehicle to determine a vehicle ground quality. The vehicle pad 104 also includes means, such as a grounding rod 108, for connecting the vehicle to an electrical ground.

In an exemplary embodiment, the sensor/electrode array 106 is integrated into the surface of the pad 104 and uses pressure sensors to determine when a vehicle is present on the pad 104. The sensors which determine the presence of the vehicle can be used to apply voltage and current through the tires of the vehicle. In another exemplary embodiment, the sensor/electrode array 106 can include optical sensors located on the outer edge of the pad 104 to detect the presence of a vehicle and the location of the vehicle tires. The electrodes can be integrated into the surface of the pad 104 and can be selected for the application of a voltage and current to the vehicle based on the determined location of the vehicle tires.

The system 100 includes means, such as, controller 110, for controlling various operations associated with the dispensing of fuel to the vehicle, and 110 can be implemented through a programmable logic controller, a processor, or any other programmable device as desired. For example, the controller 110 can select which sensor/electrodes 106 of the array are suitable for measuring the vehicle ground quality based on the location of the tires as determined by the sensors of the sensor/electrode array 106. The controller 110 can also compute a vehicle ground quality based on an impedance value computed from a current measured between the selected sensor/electrodes 106. In other exemplary embodiments, the vehicle ground quality can be input through an interface or external device.

The controller 110 is connected to receive a current measurement, and compute an impedance value there from to determine which represents a vehicle ground quality. The controller 110 evaluates the vehicle ground quality value by comparing the computed impedance value with a ground quality of the fuel dispenser 101, to obtain a difference value. The difference value is compared to an accepted value (e.g., threshold) to determine whether the vehicle ground quality is within an accepted range of the dispenser ground quality. The accepted value is an impedance value that is determined empirically based on the type of vehicle, weather conditions, tire conditions, and any other necessary parameters as desired. For example, numerous tires having various wear patterns can be tested to determine ground quality values for each respective tire, and which of these ground quality values are suitable for maintaining a safe fueling environment. These tests can be conducted at various temperature and weather conditions to ensure that all factors that may affect ground connection are considered. The accepted value is stored in a memory location 112 and is determined by the fueling facility and/or manufacturing or governmental specifications for the vehicle to be fueled.

The controller 110 can be configured to communicate with the fuel dispenser 101 to receive a dispenser ground quality value and send control signals to regulate the dispensing of fuels. The dispenser ground quality is determined by measuring an impedance value between the fuel dispenser 101 and the pad 104 based on a voltage and current applied between them.

The controller 110 can communicate with the vehicle to be fueled to obtain vehicle identification and diagnostic information. Those skilled in the art will appreciate that data communication of the controller 110 can be implemented through a network or other communication medium as desired, having a physical bus or wireless communication channel.

The system 100 includes means such as a current sensor 114, for measuring current between the two selected points on the vehicle across which a voltage is applied.

FIG. 1b shows an exploded view of an exemplary orientation of the current sensor 114 with respect to a wheel and axle structure 116 of the vehicle. The wheel and axle structure 116 includes means, such as a rotor 118, for mounting a wheel on an axle 120. The wheel and axle structure 116 also includes means, such as the axle 120, or supplying mechanical and electrical power to the rotor 118. The mechanical power is used to drive the wheels to generate vehicle velocity and the electrical power is used for providing a power signal to the current sensor 114. The axle 120 provides electrical power to the rotor 118. The rotor includes electronic circuitry to transfers the electrical power to the current sensor 114 as an electromagnetic signal. Those skilled in the art will appreciate that the electrical power present at either the rotor 118 or axle 120 is isolated from the power source depending on the location of the source through known isolation techniques (e.g., a transformer or other suitable device) so that the applied voltage does not travel through the vehicle body. In exemplary embodiments, the vehicle can apply a voltage rated at 24V and 2-20 W or any other voltage and power ratings as desired, to the axle 120.

The current sensor 114 can be fixedly attached to an outer surface of a tire 124 mounted on a wheel 122, which is removably mounted on the rotor 118. The current sensor 114 can be implemented through a programmable logic circuit or integrated circuit on any other suitable electronic device as desired, and is fixedly attached to an outer surface of the tire 124. The current sensor 114 is configured to receive an electromagnetic signal from the rotor 118. The current sensor 114 is oriented so that a bottom surface of the sensor comes in contact with the sensor/electrode array 106 of the pad 104.

In exemplary embodiments, the current sensor 114 can also be configured such that the current sensor 114 is embedded in the tire 124 or mounted on a surface of the wheel in the space between the wheel and the tire 124, or other suitable mounting configuration as desired. In these configurations, the current sensor 114 can receive the electromagnetic signal from the rotor 118 through the metal belts within the tire 116 or through its contact with the wheel 122. The current sensor 114 can make contact with the sensor/electrode array 106 through leads embedded within the tire 116.

Figure 2:
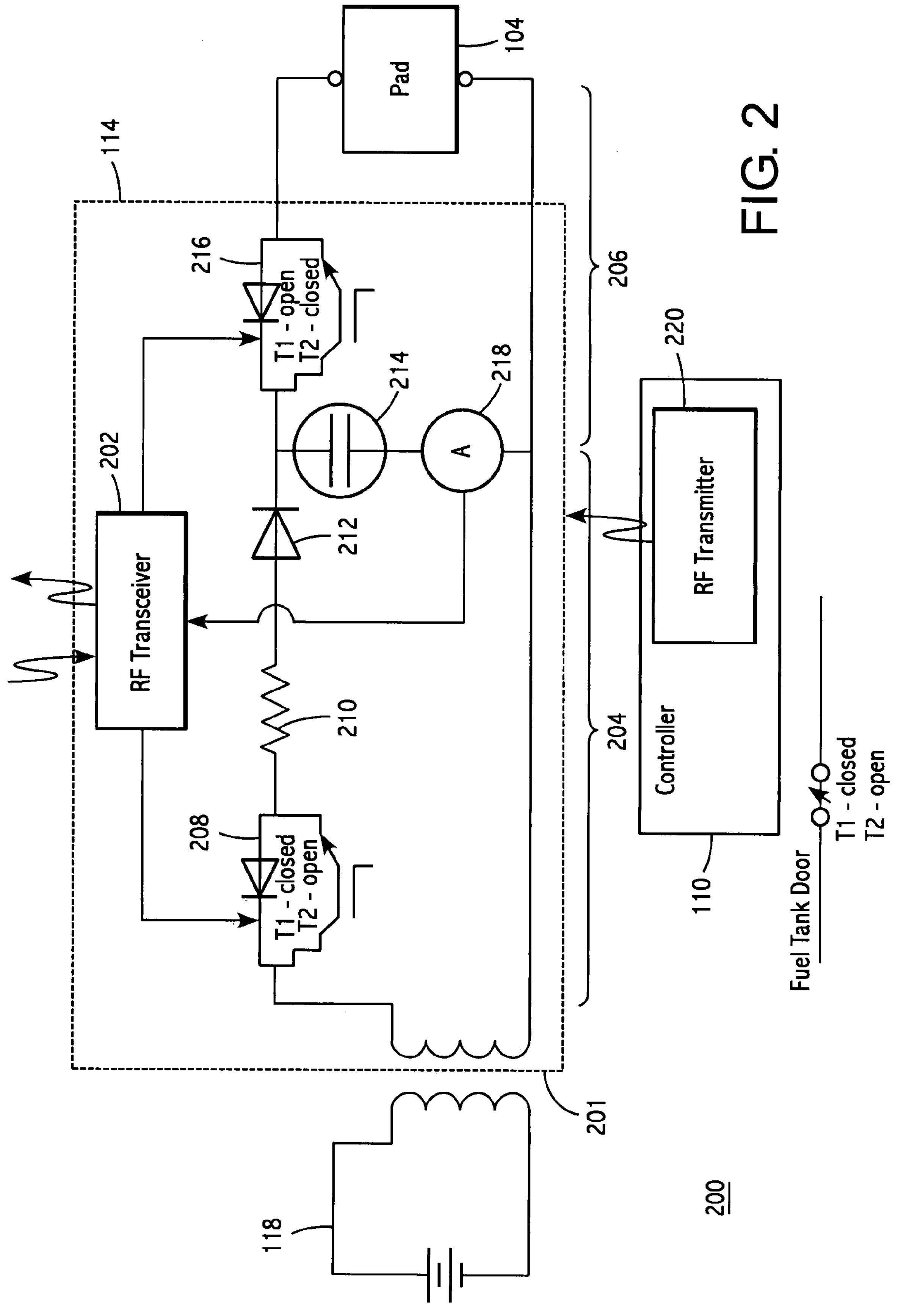
FIG. 2 shows an exemplary circuit for evaluating vehicle ground quality.

FIG. 2 shows an exemplary circuit 200 for evaluating vehicle ground quality. The sensor circuit 200 includes means, such as the current sensor 114, for measuring a current between the pad 104 and the vehicle. The current sensor 114 includes a charging circuit 204 and a discharge circuit 206, which are both connected to a shielded capacitor 214. The charging circuit 204 includes means, such as a transformer winding 201 for receiving power from the rotor 118. The charging circuit 204 also includes means, such as a switch 208, for connecting the capacitor 214 to the source. The charging circuit 204 includes means, such as a resistor 210, for limiting current, and means, such as a diode 212, for restricting the flow of current to a single direction.

The discharge circuit 206 includes means, such as a switch 216, for connecting the capacitor 214 to the sensor/electrode array 106 of the pad 104 so that the capacitor may discharge. The switches 208 and 216 can be implemented, for example, as transistor switches or other suitable switching devices as desired. The discharge circuit 206 also includes means, such as a meter 218, for measuring the current flowing through the selected points of the vehicle.

The current sensor 114 also includes means, such as a transceiver 202, for controlling the state of switches 208 and 216 based on a control signal generated by an RF transmitter 220. The RF transmitter 110 can be integrated into the circuitry of the fueling facility or the controller 110.

In a charging configuration, at a time T1 (i.e., the fuel door of the vehicle is closed), the charging switch 208 is closed, and the discharge switch 216 is open. Power is transferred from the rotor 118 of the vehicle to the charging circuit 204 through the transformer winding 201. The charging switch 208 connects the capacitor 214 to the transformer winding 201 so that the capacitor 214 can be charged as mechanical power is applied to the wheel 122.

In a discharge configuration, at a time T2 (i.e., the fuel tank door of the vehicle is open and the vehicle is in a parking gear), the transmitter 220 sends a signal to the transceiver 202. Upon receipt of this signal, the transceiver 202 generates a control signal to switch the states of the charging switch 208 and discharge switch 216. For example, the transceiver 202 generates a signal to open the charging switch 208 and close the discharge switch 216. When the charging switch 208 is open and the discharge switch 216 is closed, and the capacitor contacts the sensor/electrode array 106, the capacitor 214 discharges across the pad 104. The meter 218 measures the current flowing through the capacitor 214. The transceiver 202 obtains the current value and transmits this value to the controller 110.

Figure 3:
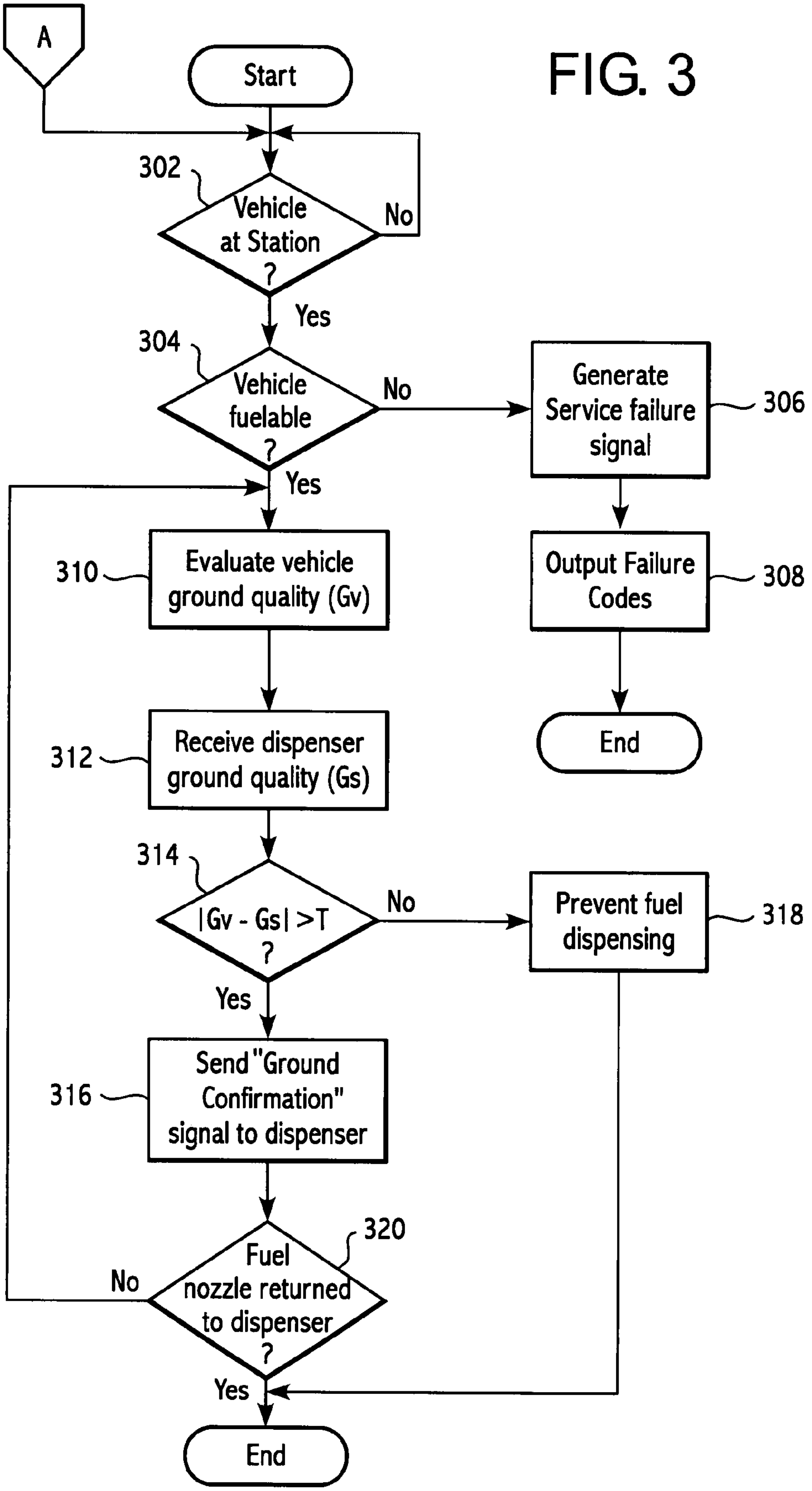
FIG. 3 shows an exemplary method for controlling the dispensing of fuel using the system of FIG. 1.

FIG. 3 shows an exemplary process for controlling the dispensing of fuel based on ground quality. The controller 110 monitors the sensor/electrode array 106 to detect the presence of a vehicle (step 302). The controller 110 interrogates an on-board computer of the vehicle to verify whether the vehicle can be fueled (step 304). This interrogation can be implemented through a wireless or physical connection between the controller 110 and the vehicle. Wireless communication between the vehicle and the controller 110 can be implemented using Bluetooth, Wi-Fi, or other wireless technology as desired. In addition, the wireless communication is encrypted and can be implemented through the use of public or private keys or any other cryptographic technique as desired.

During the interrogation, the controller 110 gathers vehicle diagnostic, identification (ID) data, and/or other vehicle data as desired. The vehicle diagnostic information is used to evaluate various systems or status of the vehicle that can impact public safety with respect to fueling the vehicle. This information can include but is not limited to fuel tank temperature, fuel tank pressure, electrical system status, and fuel system status. The controller 110 compares the gathered data against manufacturer's data obtained from resident memory (e.g., including but not limited a database located within the controller 110 and/or at the fueling facility), a government database, vehicle manufacturer database, or other external database.

When the controller 110 finds a match for the vehicle ID in the database and determines that the vehicle diagnostic data is within accepted tolerance ranges of the manufacturer's specifications, the controller 110 can evaluate quality of the ground connection for the vehicle. If the controller 110 fails to find a matching vehicle identification number or the diagnostic information fails to meet manufacturer's specifications, the controller 112 can transmit an ID or service failure signal to the fuel dispenser 101 (step 306). The fuel dispenser 101 displays and/or otherwise outputs failure codes and/or a description that details the nature of the failure and/or any steps that can be implemented to resolve the problem causing the failure (step 308). In an exemplary embodiment, if the controller 110 matches the vehicle ID to a stored ID and the vehicle diagnostic information is acceptable, the controller 110 can determine the vehicle ground quality.

In this step, the controller 112 also interrogates the fueling facility to determine whether the pad 104 is properly grounded. The pad 104 is determined to have a proper ground when an impedance value is between 10-20 w, or other suitable impedance range established based on safety considerations.

Once the controller 110 determines that the vehicle can be safely fueled, the controller 110 measures the vehicle ground quality (step 310). The vehicle ground quality measurement can be an active measurement or an input of an earlier measurement. In an exemplary embodiment, the process of measuring vehicle ground quality is discussed in detail with respect to FIG. 4. After measuring the vehicle ground quality, the controller 110 receives a dispenser (i.e. fueling facility) ground quality (step 312). The controller 110 compares the received dispenser ground quality to the vehicle ground quality to determine whether the vehicle ground quality is within a safe range (step 314).

For example, the processor 110 computes a difference (e.g., absolute value) between the vehicle ground quality and the fuel dispenser ground quality, and compares this difference to a predetermined threshold. This threshold can be determined based on conditions relevant to the fueling facility (e.g., weather, temperature, moisture, or other conditions as desired) along with parameters relevant to the type of vehicle to be fueled (e.g., tire wear, tire size, tire pressure or other parameters as desired). If the vehicle ground quality is determined to be within an accepted safe range (e.g., within 1-2Ω and/or 25% of the dispenser ground quality), the processor 110 generates a ground confirmation signal to enable the dispensing of fuel to the vehicle (step 316). On the other hand, if the processor 110 determines that the overall ground quality is outside the accepted safe range, the processor 110 does not generate a ground confirmation signal and thus prevents the dispensing of fuel to the vehicle (step 318).

The vehicle ground quality can be continuously monitored (e.g., measured) while the vehicle is being fueled. The controller 110 can interrogate the processor 103 of the fuel dispenser 101 to determine whether the fueling nozzle is docked (step 320). If the fueling nozzle is docked, the controller 110 can determine that the ground quality monitoring is no longer needed. On the other hand, if the fueling nozzle is undocked, the controller 110 determines whether the acceptable status of the vehicle ground quality is maintained by repeatedly measuring the vehicle ground quality as needed and comparing the measured value to the dispenser ground quality.

In the event that the vehicle ground quality is outside an accepted range, respectively, the processor 110 can deactivate the ground confirmation signal so that the dispensing of fuel is aborted. Therefore, in addition to detecting the existence of a ground connection for the vehicle, the system 100 can determine whether the quality of the vehicle ground connection is suitable to sustain a safe fueling environment. For example, the condition of the tires on a vehicle to be fueled can influence the connection between the tires and the concrete. The system 100 determines whether the ground connection of the tires is a good connection to effectuate safe fueling of the vehicle.

Figure 4:
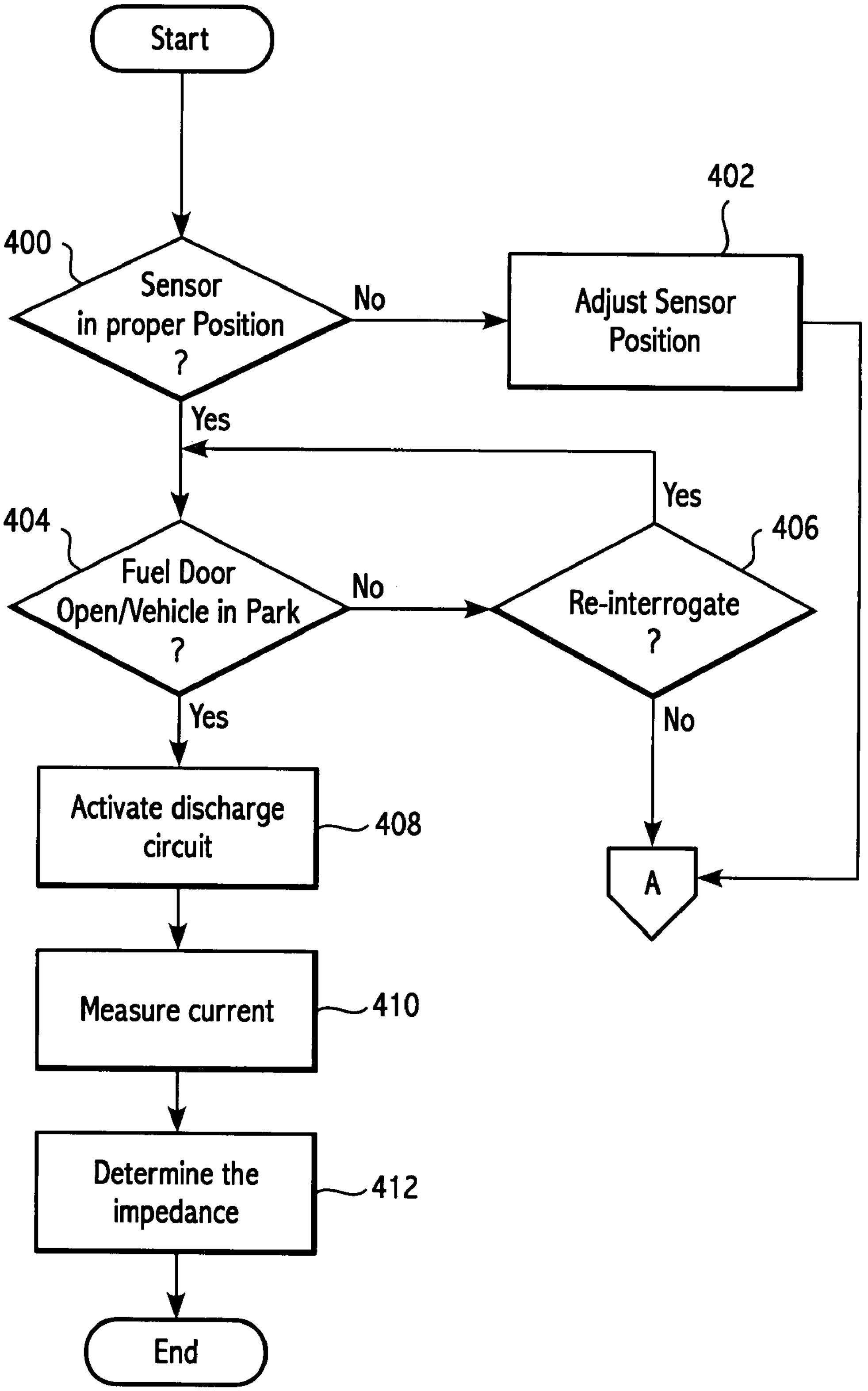
FIG. 4 shows an exemplary method for evaluating vehicle ground quality.

FIG. 4 shows an exemplary process for evaluating vehicle ground quality. In this process, the controller 110 determines whether the current sensor 114 is in a proper position, e.g., in contact with the sensor/electrode array 106 of the pad 104 (Step 400). In exemplary embodiments, this determination can be made, for example, through a signal generated by the sensor/electrode array 106 or the current sensor 114 when proper contact is established. If the current sensor 114 is not in a proper position, the controller 110 sends a signal to the vehicle on-board computer or the fuel dispenser 101 so that a message indicating that the sensor position should be adjusted can be displayed (Step 402). The controller 110 aborts the ground quality evaluation and presence of the vehicle is again detected (Step 302 in FIG. 3).

If, on the other hand, the current sensor 114 is in a proper position, the controller 110 interrogates the on-board computer of the vehicle to determine whether the fuel door of the vehicle is open and whether the vehicle is in a parking gear (Step 404). If the fuel door is closed, the controller 110 re-interrogates the on-board computer a predetermined number of times to determine whether the fuel door is open (Step 406). In exemplary embodiments, the controller may re-interrogate the on board computer of the vehicle for a predetermined number of attempts (e.g., 3) or within a predetermined amount of time (e.g., 10 sec.) for determining whether the fuel door is open and whether the vehicle is in the parking gear. In either case, if the step is not executed within the allotted constraint, then the controller 110 aborts the ground quality evaluation and the presence of a vehicle must again be detected (Step 302 in FIG. 3).

If the fuel door is open, the controller 110 sends a signal to the transceiver 202 to activate the discharge circuit 206 (Step 408). The transceiver 202 obtains the current measurement of the meter 218 and transmits this value to the controller 110 (Step 410). The controller 110 processes the current measurement and computes an impedance value, which represents the ground quality of the vehicle (Gv) (Step 412).

Those skilled in the art will appreciate that the disclosed embodiments described herein are by way of example only, and that numerous variations will exist. The invention is limited only by the claims, which encompass the embodiments described herein as well as variants apparent to those skilled in the art.

What is claimed is:

1. A method for controlling the dispensing of fuel based on a ground detection, comprising:

(a) measuring a vehicle ground quality, the measuring comprising causing current flow between a sensor connected to the vehicle and plural electrodes each located adjacent to the vehicle;

(b) providing a dispenser ground quality;

(c) evaluating the vehicle ground quality based on the dispenser ground quality and a threshold value; and (d) controlling the dispensing of fuel based on the evaluating.

2. The method of claim 1, wherein the evaluating comprises:

computing a difference value between the vehicle ground quality and the dispenser ground quality.

3. The method of claim 2, wherein the controlling comprises:

permitting the dispensing of fuel when the difference value is within a predetermined range of the threshold value.

4. The method of claim 1, wherein the measuring comprises:

applying voltage across two points of the vehicle;

measuring an impedance value or current value between the two points; and determining whether the measured impedance is within an accepted impedance range.

5. The method of claim 1, wherein the ground quality is measured across two tires of the vehicle.

6. The method of claim 3, comprising:

repeating steps (a)-(d) when the dispensing of fuel is permitted.

7. A system for controlling a dispensing of fuel, comprising:

a fuel dispenser having a dispenser ground quality;

a vehicle sensor that measures a vehicle ground quality, the vehicle sensor attached to a wheel or a tire of a vehicle, the vehicle sensor comprising a charging circuit that receives power from a rotor coupled to the wheel or the tire; and a controller that evaluates the vehicle ground quality based on the dispenser ground quality and a threshold value, and controls the dispensing of fuel from the fuel dispenser based on the evaluation.

8. The system of claim 7, wherein the fuel dispenser includes a transceiver for sending and receiving data.

9. The system of claim 7, wherein the controller includes a transceiver for sending and receiving data.

10. The system of claim 7, further comprising a pad upon which the vehicle rests, wherein the pad comprises a grounding device for grounding the vehicle.

11. The system of claim 10, wherein the pad further comprises:

electrodes that apply a voltage across two terminals on the vehicle while the pad is grounded, wherein the vehicle sensor further comprises a meter that measures an impedance across the two terminals.

12. The system of claim 11, wherein the two terminals of the vehicle are tires.

13. An apparatus that evaluates a ground quality of a vehicle to be fueled at a fueling facility, the apparatus comprising:

means for storing a dispenser ground quality value;

means for grounding the vehicle;

means for measuring a vehicle ground quality value; and means for generating a control signal based on a comparison of the dispenser ground quality value and the vehicle ground quality value and sending the control signal to the dispenser to control the dispensing of fuel.

14. The apparatus of claim 13, wherein the generating means is configured for computing a difference between the dispenser ground quality value and the vehicle ground quality value and comparing the difference to a threshold.

* * * * *